United States Patent [19]

Sela

[11] Patent Number: 5,058,691

[45] Date of Patent: Oct. 22, 1991

[54] INFRARED DETECTOR FOR ENSURING CORRECT WEIGHING

[75] Inventor: Rafi Sela, North Potomac, Md.

[73] Assignee: W. G. Associates, Bethedsa, Md.

[21] Appl. No.: 502,747

[22] Filed: Apr. 2, 1990

[51] Int. Cl.[5] ..................... G01G 19/52; G01G 21/22
[52] U.S. Cl. ...................................... 177/50; 177/253
[58] Field of Search ................... 177/25.15, 145, 50, 177/253

[56] References Cited

U.S. PATENT DOCUMENTS

| 4,049,068 | 9/1977 | Kavanagh et al. | 177/25.15 |
| 4,356,874 | 11/1982 | Blincow et al. | 177/145 X |
| 4,760,539 | 7/1988 | Amacher et al. | 177/25.15 X |

Primary Examiner—George H. Miller, Jr.
Attorney, Agent, or Firm—Pollock, VandeSande & Priddy

[57] ABSTRACT

Parallel infrared beams are directed along opposite edges of an electronic scale which has its weighing platform mounted flush with a supermarket check-out counter. In the event that an object being weighed overhangs the scale and contacts the counter, it will break one or more beams. Means are provided for detecting the interruption of a beam and a disable control signal is generated. Normally, an electronic cash register is connected to an output of the scale for computing the price of a weighed object. However, when the disable signal is generated, communication between the scale and the electronic cash register is disabled, thereby preventing computation of an incorrectly weighed object.

6 Claims, 2 Drawing Sheets

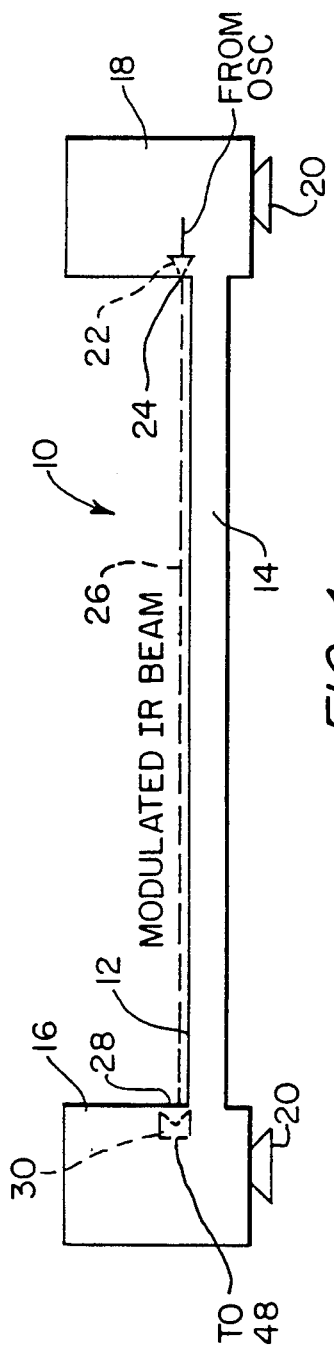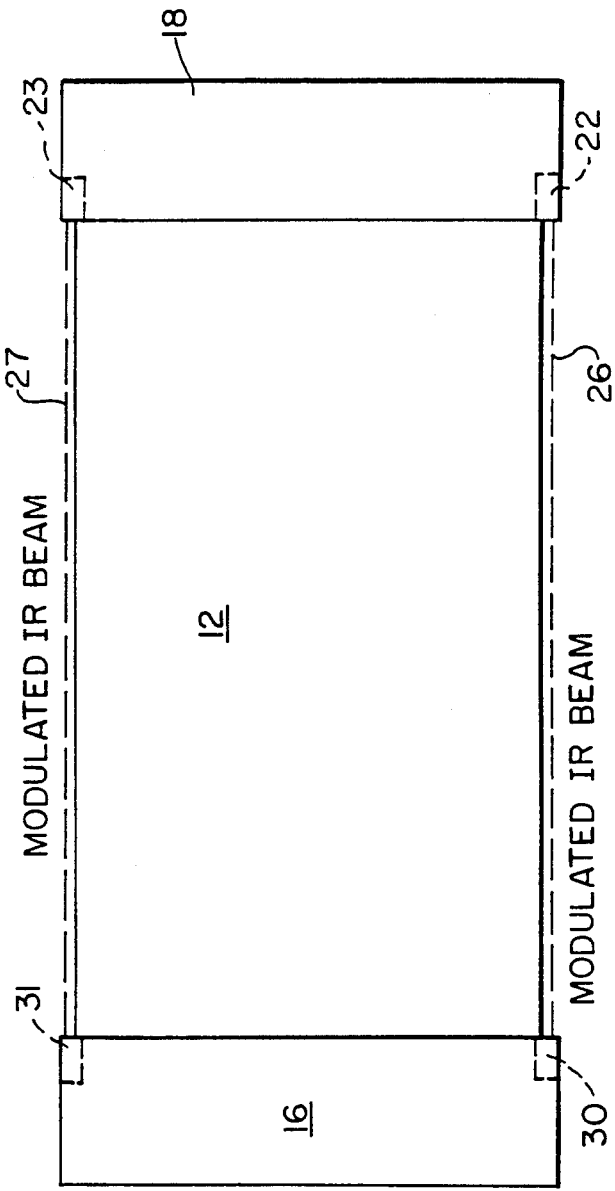

INFRARED DETECTOR FOR ENSURING CORRECT WEIGHING

FIELD OF THE INVENTION

The present invention relates to infrared detectors, and more particularly to a detector for ensuring that goods being weighed are correctly positioned on a scale.

BACKGROUND OF THE INVENTION

A current trend in supermarket check-out stand technology is the incorporation of a scale into the check-out counter surface. Typically, these scales overlay check-out scanning devices, the scale having an aperture therein which permits the checker to use the limited space of a check-out counter for both scanning product bar code labels as well as weighing produce. An example of this type of scale is manufactured by Shekel Electronics, Inc., and designated as Model SC 150. A marked advantage of such a scale is the elimination of a separate scale at some distance from the check-out counter which decreases the ability of the checker to quickly check through customers waiting in line.

Although this type of scale is becoming increasingly popular, it does exhibit a fault in terms of precision. This arises due to the fact that large produce or goods to be weighed often extend beyond the periphery of the scale and come to rest on the check-out counter surface. This results in a lower weight being recorded than is actually the case. Accordingly, the supermarket undercharges its customer. A second precision problem is due to having products from either side of the belt or bagging area touch the scale surface thus creating an incorrect weight and overcharging the customer.

It would, therefore, be desirable to detect situations where inaccurate weighing is taking place due to poor positioning of produce or other goods on a check-out counter scale, or other types of interference with the scale weighing plate.

BRIEF DESCRIPTION OF THE PRESENT INVENTION

The present invention offers an infrared system, incorporated in a check-out counter scale, for detecting poor placement of produce or goods on the scale which will result in inaccurate weighing. The system basically incorporates separate infrared beams along both longitudinal edges of a check-out counter soale which do not interfere with the normal communication of weight by an electronic cash register, as long as the beams are not physically interrupted. If either or both of the beams are interrupted, it becomes an indication that a portion of weighed produce or other goods extends beyond the bounds of the scale, thereby likely resting on the check-out counter surface and causing incorrect weighing. By virtue of the present invention, an interruption in either or both of the beams generates a disable control signal to the check-out electronic cash register, thereby preventing the recordation and computation of an erroneous price based on the inaccurate weighing. An error code is displayed on the electronic cash register thereby alerting the checker that the produce or other goods must be repositioned correctly.

The present invention anticipates that from time to time unusually large produce or goods will have to interrupt one or more of the beams due to the size of the object. When this occurs, the checker may have the option of overriding the system by manually entering the weight causing its computation by the electronic cash register. However, the recordation of such a manual entry occurs on a sales slip thereby providing written evidence in the event there is a dispute between customer and supermarket as to the weighing of the particular item.

The invention alternately envisions the utilization of four beams to completely monitor all four edges of a scale weighing platform. The addition of two lateral beams ensures the detection of overhang along the lateral platform edges.

BRIEF DESCRIPTION OF THE FIGURES

The above-mentioned objects and advantages of the present invention will be more clearly understood when considered in conjunction with the accompanying drawings, in which:

FIG. 1 is a side elevational schematic view of the present invention installed in an electronic scale;

FIG. 2 is a top plan schematic view of the present invention installed in an electronic scale;

DETAILED DESCRIPTION OF THE INVENTION

Figure 3:
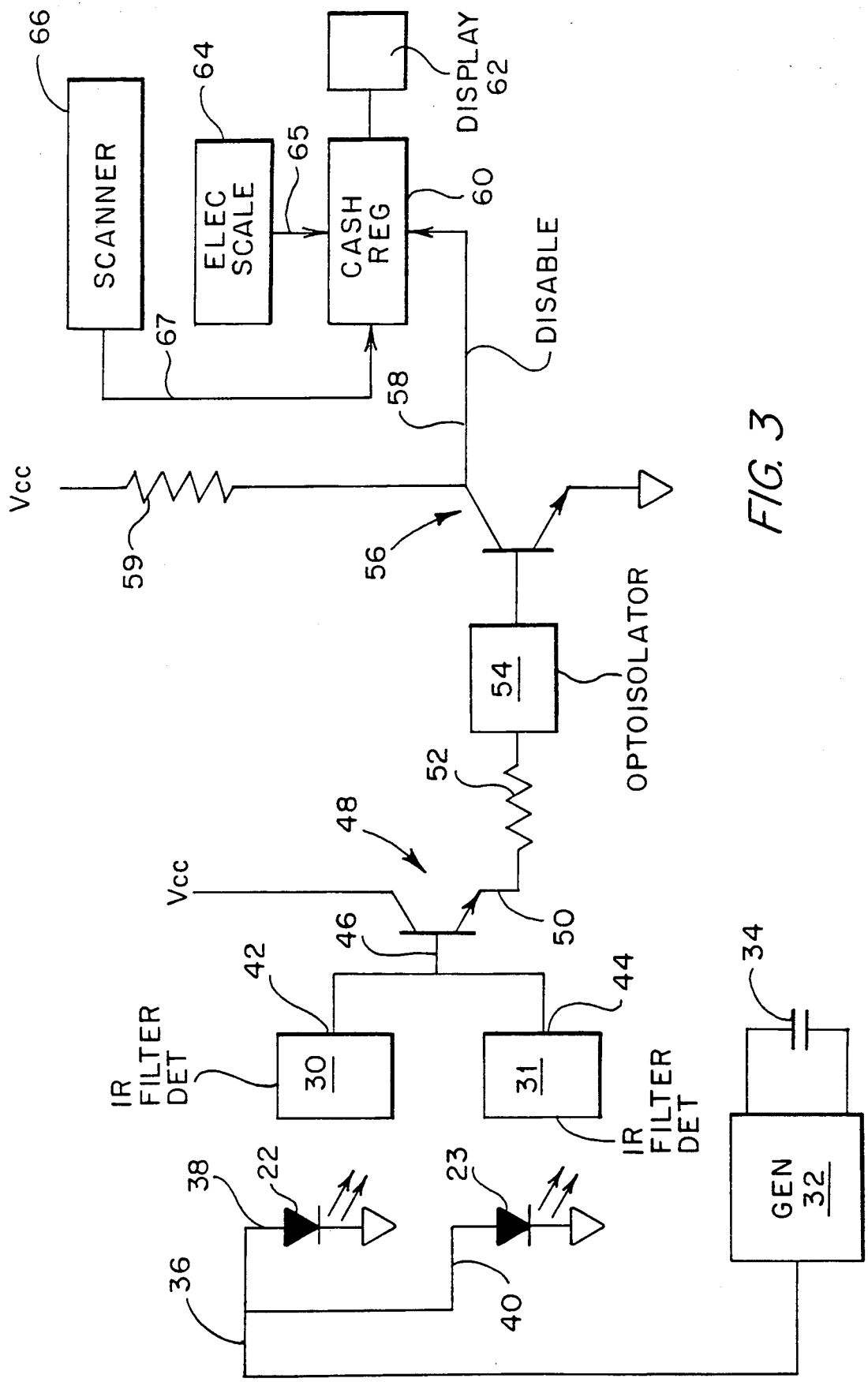
FIG. 3 is a schematic electrical diagram of the present invention.

FIG. 1 is a side elevational view of a check-out counter scale, generally indicated by reference numeral 10 and is of the type previously identified. The present invention is physically housed within such a scale and cooperates with its components, as will now be discussed. Typically, the scale includes a weighing platform 12 defining the top surface of a rectangular housing section 14. Upstanding housing sections 16 and 18 append from the horizontal rectangular section 14 thereby defining the housing of the scale. Elastomeric pads 20 extend from the lower surface of the housing section 14 and rest upon a check-out counter surface or the top of a flat bed scanner (not shown). The scale is an electronic scale incorporating strain gauge load cells which generate signals indicative of weight. Thus far described the scale is of the prior art type previously mentioned.

The improvement resides in the incorporation of mean for producing at least two modulated infrared (IR) beams 26 and 27 extending along corresponding longitudinal edges of the scale platform 12. Transverse beams 26' and 27' may be added but the following discussion concentrates on dual beam (26, 27) opeation only, for simplicity. The purpose of the present invention, as previously discussed, is to present infrared boundaries for the scale platform which become interrupted when large-sized produce or other goods are positioned on the scale and extend over the scale platform 12. The interruption of one or more IR beams will alert the checker as to the condition, thereby enabling him to correct it.

The first IR beam 26 is generated by an infrared light source in the nature of a light-emitting diode 22 positioned within the housing section 18. Such a diode is of the type manufactured by the Sharp Company of Japan and designated by Model No. GL 528. The wall of the housing section includes an aperture 24 to concentrate beam 26 along the length of the scale toward housing section 16 Within the latter-mentioned upright housing section is an IR filter-detector assembly 30 located immediately behind a small drilled aperture 28 formed in the wall of the housing section 16 which is practically designed to admit only the light emitted from corresponding light-emitting diode 22. The filter/detector assemblies 30 and 31 may be of the type manufactured by the Sharp Company of Japan and designated by Model No. GP 1U52X.

A second set of IR transmitter-receiver components identical to light-emitting diode 22 and filter/detector assembly 30 are identified by respective reference numerals 23 and 31 in FIG. 2. These components generate a second IR beam 27 along an opposite longitudinal edge of the scale platform 12.

In order to minimize the detection of other IR sources within the environment of the filter/detector assemblies, the IR beams are modulated. FIG. 3 indicates frequency generator 32 for generating an oscillating or modulated signal due to the inclusion of regenerative feedback capacitor 34. The generator 32 is a conventional component and may be desiqned to generate a pulse or sinusoidal signal at output terminal 36, typically having a frequency of 40 KHz. This output is connected in parallel to two leads 38 and 40, both in turn connected to respective LEDs 22 and 23. These are, in effect, IR transmitters of modulated IR beams 26 and 7. One example of an appropriate frequency generator is manufactured by National Semiconductor Company and designated as Model 555.

The filter/detector assemblies effectively filter or demodulate received IR beams and accurately detect the presence of the modulated IR beams 26 and 27 while disregarding extraneous IR light from other ambient sources.

When either of the beams 26 or 27 is broken, the signal level at output 42 and/or 44 is changed, thereby providing a trigger at the base terminal 46 of switching transistor 48. The output emitter terminal 50 of the transistor 48 is connected to a load resistor 52 which couples a pulse signal from transistor output terminal 50 to an opto-isolator 54. The opto-isolator couples this pulse signal to the base terminal of transistor 56 having a load resistor 59 connected to its collector terminal 58. The opto-isolator is an electro-optic component of conventional design which transfers the output of transistor 48 to transistor 56 without the introduction of noise. An appropriate device is manufactured by General Instruments Corporation and is designated Model 4N35. The collector presents an amplified, precise control signal of preselected level which serves as a Disable signal for an electronic cash register 60 of conventional design. The cash register typically includes a display 62. This type of cash register includes an input port 65 for the conventional electronic scale readout circuits diagrammatically indicated by reference numeral 64. Also, a conventional scanner 66 is connected to a scanner port 67 of the cash register 60.

In operation of the device, when either or both of the IR beams have been broken, the event will be detected by the circuitry shown and discussed in connection with FIG. 3.

A Disable signal appearing at the output of transistor 56 prevents the computation of data from the electronic scale readout circuit 64 and an Error signal is displayed on display 62. At this point the checker is encouraged to re-position produce or goods on the scale platform 12 until the beams become uninterrupted and the electronic cash register is permitted to compute the weighed item. However, if interruption of the beam is unavoidable due to the size of the item, the checker has the option of manually entering the weight indicated on the scale display (not shown) so that a transaction may be completed. Software in the electronic cash register 60 permits this override feature and will indicate, on the sales receipt, that a manual override for the particular transaction has been made. The particular software for conventional electronic cash registers for producing this effect is well known to those in the industry and does not form part of the present invention.

Products resting in part or touching the scale platform 12 on either side of the scale may cause a higher weight to be recorded thereby overcharging the customer. In order to prevent this, two additional thin beams (not shown) may be transmitted and received along the remaining transverse weighing platform edges in a manner identical to that of beams 26 and 27.

Thin beams exist along the edge of scale platform 12 and therefore a large object such as a watermelon pose no problem since they rest well within the beams when being weighed while the overhanging portion of the watermelon extends beyond the scale platform 12 well above the beams.

Although the present invention has been described in terms of its utilization with a check-out counter scale, it is to be understood that it may be mounted on any weighing unit communicating with a computational system, for example self-counting scales to be used by customers in the produce area.

Thus, from the preceding discussion, it will be appreciated that the present invention offers a means for cutting communication to an electronic cash register if one or both beams of the scale are interrupted. The resultant error message on a cash register display 62 alerts the checker that corrective action must be taken to perform correct weighing.

It should be understood that the invention is no limited to the exact details of construction shown and described herein for obvious modifications will occur to person skilled in the art.

I claim:

1. A system for ensuring accurate weighing with an electronic scale, the system comprising:
   means for simultaneously transmitting light beams along at least two opposite edges of the scale weighing platform;
   receiving means for simultaneously detecting the transmitted light beams when objects being weighed are located entirely within the beam;
   the receiving means detecting an interruption of one or more light beams by an object overhanding the scale weighing platform.

2. The structure set forth in claim 1 together with means connected to the receiving means for generating a signal for disabling a computational device connected to the scale, the device normally computing a purchase price for the weighed object.

3. A supermarket check-out system comprising:
   an electrical cash register;
   an electronic scale having a weighing platform generally located flush with the surface of a check-out counter, the length of which defines a longitudinal direction;
   means connecting the output of the scale to the input of the electronic cash register for computing the price of a weighed object;
   means for transmitting light beams along at least the longitudinal edges of the weighing platform;

means for receiving the transmitted light beam when objects being weighed are located entirely within the beam;

means connected between the receiving means and the electronic cash register for conducting a disablingh signal thereto, when at least one beam is interrupted, which prevents the computation of price for an incorrectly weighed item.

4. The system set forth in claim 3 wherein the transmitting means transmits light along the entire periphery of the weighing platform.

5. A method for preventing price computation by an electronic cash register of an erroneous weighed item on an electronic scale, the method comprising the steps:

directing IR beams along at least the longitudinal edges of a scale weighing platform, the platform being generally flush with a check-out counter surface, the length of which defines the longitudinal direction;

normally computing the price of a weighed item with the electronic cash register;

detecting when an overhand object being weighed interrupts at least one beam; and disabling computation of an overhanging object undergoing weighing.

6. The method set forth in claim 5 wherein IR beams are directed around the entire periphery of the weighing platform.

* * * * *